United States Patent [19]

Hsu et al.

[11] 4,399,011
[45] Aug. 16, 1983

[54] SEPARATION OF HYDROGEN ISOTOPES

[75] Inventors: David S. Y. Hsu, Clinton; Thomas J. Manuccia, Jr., Silver Spring, both of Md.

[73] Assignee: The United States of America as represented by the Secretary of the Navy, Washington, D.C.

[21] Appl. No.: 250,998

[22] Filed: Jan. 3, 1981

[51] Int. Cl.³ .................. C01B 3/32; B01D 59/00
[52] U.S. Cl. .................. 204/163 R; 204/163 HE; 423/2
[58] Field of Search .................. 423/2; 204/157.1 R, 204/163 R, 163 HE

[56] References Cited

U.S. PATENT DOCUMENTS

| 4,000,420 | 12/1976 | Harris | 250/281 |
|---|---|---|---|
| 4,025,408 | 5/1977 | Marling | 204/163 |
| 4,081,339 | 3/1978 | Benson | 204/158 |
| 4,097,384 | 6/1978 | Coleman et al. | |

OTHER PUBLICATIONS

Mayer et al., "Isotope Separation With the cw Hydrogen Fluoride Laser," Applied Physics Letters 12-1-2-70, pp. 516-519.
Hsu et al. "Deuterium Enrichment by CW $CO_2$ Laser-induced Reaction of Methane," Applied Physics Lett. 33(11) pp. 915-917.
Chien et al., J. Phys. Chem. 80:13, 1405 (1976).
Mayer et al., App. Phys. Lett. 17, 516 (1970).
Manuccia et al. J. Chem. Phys. 68:5 (1978).

Primary Examiner—Brooks H. Hunt
Attorney, Agent, or Firm—Robert F. Beers; William T. Ellis; Thomas E. McDonnell

[57] ABSTRACT

Isotopes of hydrogen are separated by reacting a normal alkane, its deuterated form, atomic bromine, a deactivating gas, and a isotopically selective vibrational sensitizer gas selected from the class consisting of carbon dioxide, carbon monoxide, nitrogen, and mixtures thereof and separating the products which are enriched in deuterium.

8 Claims, 3 Drawing Figures

SEPARATION OF HYDROGEN ISOTOPES

BACKGROUND OF THE INVENTION

The present invention pertains generally to isotope separation and in particular to laser-induced separations of hydrogen isotopes.

The objective of laser-induced separations of isotopes is to selectively transform molecules of one isotope into an enriched chemically distinct species which is capable of being chemically separated by subsequent processing and hence enriched. Generally, this type of isotope separation involves a preferential vibrational excitation of molecules of the desired isotope, followed by a chemical reaction, a uv photodissociation, or photoionization.

Even if molecules containing a certain isotope absorb energy preferentially, isotopic specificity can be destroyed by intermolecular VV energy exchanges between the various isotopically substituted species or by bulk heating. Interisotope VV transfer is near-resonant and therefore very fast, typically on the order of ten gas kinetic collisions. For a given molecule, it is very difficult to find a reaction which proceeds at a rate comparable to a VV transfer, simultaneously shows appreciable vibrational enhancement and yields a product which does not undergo a rapid chemical isotope exchange with the reagents. Bulk heating, due to VT relaxation of the excited species, increases the rate of the nonselective thermal reaction and therefore can completely mask the vibrational component of the reactivity change.

Besides isotopic specificity, an isotope separation must have several additional characteristics in order for it to have any commercial potential. Due to energy costs, isotopic spcificity occurring at excitations among the lowest two or three vibrational levels is most desirable. The separation must also be pressure scalable to be commercially viable. In other words it must be able to operate over a wide range of pressure, particularly pressures above those typically employed in the resarch laboratory.

Laser-induced separations involving spontaneous photodissociations due to vibrational excitation of low-lying vibrational levels are few. Large fractionation ratios are disclosed for the decomposition of $D_3BPF_3$ and $H_3BPF_3$ in K—R Chien and S. H. Bauer, J. Phys. Chem. 80(13), 1405 (1976). This method utilizes a direct absorption of photons by a costly reagent and thus can only proceed if a laser can operate at the absorption band and if no excessive bulk heating of the reactant occurs.

The separation techniques disclosed in U.S. Pat. No. 4,097,384 issued to Coleman et al on June 27, 1978, includes dissociating an uranium ligand as well as the more common scheme of a subsequent preferential reaction of the selectively excited molecules with another reactant. This method also relies on a direct absorption of photons to obtain a vibrational excitation of the molecules and has the same problems previously discussed. The necessity of having a laser operate in the fundamental absorption band of the molecule being excited is attempted to be solved by relying on absorptions at the overtones. These absorptions are relatively small and thus scalability to larger systems is difficult.

The separation method in S. W. Mayer, M. A. Kwok, et al, App. Phys, Lett. 17, 516 (1970) is another direct absorption method. An H:D separation is achieved through an isotopically specific reaction in a $CH_3OH:CH_3OD:Br_2$ gas-phase mixture at a pressure of about 100 torr which has been excited with a 90 w cw HF laser. All attempts to reproduce the results have failed, due probably to bulk heating of the gas mixture, VV transfer, and chemical isotopic scrambling between reagents and products.

As was stated previously, a major cause for failures of isotope separation attempts is the rapid rate of intermolecular VV energy exchanges between isotopically substituted species exceeding the rate of the chemical differentiation step. This whole question has been left unanswered in previous research work. It has been pointed out that if the total rate of deactivation of the excited vibration is comparable to or faster than the rate of interisotopic VV exchange, isotopic selectivity on a CW basis is preserved as well as establishing pressure scalability. This concept has been termed the competing-deactivation technique. In Manuccia et al., J. Chem. Phys. 68(5), Mar. 1, 1978, this technique is used to enrich $^{79}Br$ or $^{81}Br$ in the products of the radical chain reaction of chlorine atoms with natural isotopic-abundance methyl bromide by exciting the respective $CH_3Br$ in a low-pressure, discharge flow reactor intracavity to a $CO_2$ laser.

A deuterium separation by the competing-deactivation technique is disclosed in Hsu et al Advances in Laser Chemistry, ed. by A. H. Zewail, Springer Series in Chemical Physics, p. 88–92, and in Hsu et al Appl. Phys. Lett. 33(11), p. 915–17, (Dec. 1, 1978), A CW $CO_2$ laser is used to vibrationally excite $CH_2D_2$ in a mixture of $CH_2D_2$ and $CH_4$ while an intentional VT deactivation by argon atoms and the reactor walls competes with interisotope VV transfer to produce a gas sample in which the $CH_2D_2$ is excited and the $CH_4$ remains less excited on a steady state basis. A reaction of this gas mixture with chlorine atoms and molecules forms a stable product, deuterated methyl chloride, enriched in deuterium by up to 72%. This method can be considered technically important because it is the most energy efficient laser method for deuterium to date. The projected energy efficiency, however, is below that of the current $H_2S/H_2O$ process because of the high energy costs of pumping, refrigeration and reactant regeneration imposed by use of the thermoneutral reaction.

SUMMARY OF THE INVENTION

It is, therefore, an object of the present invention to separate hydrogen isotopes using an inexpensive and readily available feedstock by a highly energy efficient, pressure-scalable process having a high enrichment factor.

A further object of this invention is to excite, at moderate laser fluxes and in reasonable path lengths, isotopic forms of reagent molecules which could not be excited directly by a laser.

A still further object of the present invention is to produce isotopical selective excitation by energy not coming from lasers.

These and other objects are achieved by imparting vibrational excitation to sensitizer molecules, transferring the vibrational excitation to a mixture of normal and deuterated alkanes, whereby the deuterated alkane is preferentially excited, reacting the alkane mixture with bromine atoms, and separating the deuterated end products.

DETAILED DESCRIPTION OF THE INVENTION

Figure 1:
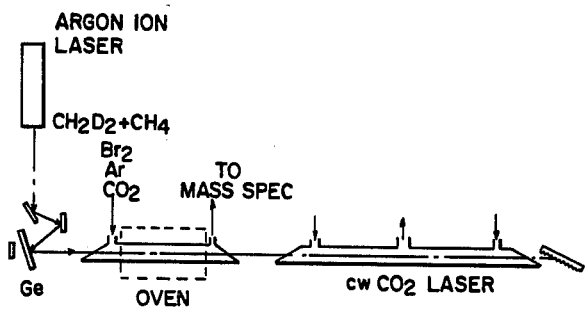
FIG. 1 is a schematic drawing of the apparatus used in demonstrating the effectiveness of the present technique for separating hydrogen isotopes.

It is theorized that during the present isotope separation, using $CO_2$ as the isotopically selective vibrational sensitizer molecule and methane as the feedstock, the following reactions occur:

$$CH_2D_2 + CO_2 \xrightarrow{k_1} CH_2D_2(V) + CO_2 \quad (1)$$

$$CH_4 + CO_2 \xrightarrow{k_2} CH_2(v) + CO_2 \quad (2)$$

$$Br + CH_2D_2(V) \xrightarrow{k_r^1} \begin{array}{c} HBr + CHD_2 \\ DBr + CH_2D \end{array} \quad (3)$$

$$Br + CH_4(v) \xrightarrow{k_r^2} HBr + CH_3 \quad (4)$$

$$d_0, d_1\text{-}, d_2\text{- methyl} + Br_2 \xrightarrow{fast} \text{methyl bromide} + Br \quad (5)$$

The bromine atoms also react thermally with ground-state methane molecules to a small extent at temperatures below 160° C. In the above reactions, $k_1$ is greater than $k_2$, which results in a greater degree of initial vibrational excitation (faster temperature) in $CH_2D_2$ than in $CH_4$. The higher and lower vibrational temperatures are indicated by "V" and "v" respectively. Deuterium enrichment then results because $k_r^1$ exceeds $k_r^2$. It is noted that the branching ratios for the two reactions in (3) are approximately equal because of moderate classical kinetic isotope effects and participation of both C—H and C—D bonds in vibrational excitation of the small $CH_2D_2$ molece. It should also be noted that both the hydrochloric acid and methyl bromide products of reaction (3) must be collected for an efficient application of this process.

The relative rates of these various reactions are established by the usual to the VT-competing deactivation processes, in addition to VVT-competing deactivation processes which occur in the overall reaction as a result of the presence of large amounts of $CO_2$ sensitizer and molecular bromide. All of these deactivation processes compete with VV interisotope energy transfer preserving the initial excitation selectivity and contributing to the higher degree of steady state vibrational excitation in the deuterated methane than in normal methane.

The above discussion is only a partial explanation of the complex chemistry of the present invention. It is given by way of a possible explanation of the present invention and is not intended to limit the invention to any specific theory. It should be noted that for any reaction scheme to effect an isotope separation, these reactions, along with all of the excitation, transfer of excitation, deactivation, and reaction events occurring between the introduction of the reactants with the reactor and the formation of products, must produce an accumulation of isotope effects which results in a segregation of isotopes, a result being entirely unpredictable a priori.

In practice, an isotopically selective vibrational sensitizer gas, a deactivating gas, atomic bromine, and a mixture of a protonated alkane and one or more of its deuterated species are introduced into a reaction system. The sensitizer gas can be excited to higher energy levels either before or after its introduction into the reaction chamber. The reaction system has a temperature from about 90° to about 220° C. with a preferred range from 100° to 200° C., a total pressure from about 0.5 Torr to about $10^4$ Torr with a commercially preferred range from $10^2$ to $10^4$ Torr, and a reactant partial pressure from about $7 \times 10^{-3}$ to about $5 \times 10^3$ Torr with a commercially preferred range from 50 to 500 Torr.

The vibrationally excited sensitizer molecules transfer their energy preferentially to vibration in the deuterated alkane molecules and not the undeuterated species, thus acting as an isotopically selective vibrational sensitizer molecule, a new concept. Due to the competing deactivation processes present in the reaction system, the deuterated alkane molecules remain more highly excited than the normal alkane molecules on a steady-state basis and accordingly react, with bromine atoms at a faster rate than protorated alkane molecules.

The process of this invention can be easily operated on a continuous basis rather than on a batch basis. The gases are pumped, at the above pressures, through a flow cell which is maintained at the above temperatures by, e.g., an oven. Adjustment of the operating parameters of the process would be based on economic optimization considerations, balancing throughput, energy, and reagent costs against enrichment factor and reaction rate choice. The size and shape of the flow cell depend on the power and output beam quality of the laser, if a laser is used to excite the sensitizer molecules, in situ, the volumetric flow rate and the operating pressure. Any shape and size which provides a uniform flux and allows a saturated or nearly saturated vibrational energy content of the sensitizer gas can be used. If the flow cell is constructed of a material, (e.g., pyrex), which promotes recombination of bromine atoms, it is to be coated with a substance which inhibits atom recombination (e.g., phosphoric acid).

The present technique permits a great latitude in designing the reaction system. Total and reagent partial pressures and flow rates, laser power, and reaction systems design are all interrelated and vary greatly. A few sample runs of any system would quickly determine the conditions which would most economically produce saturation, i.e., the point at which the enrichment does not increase. For example, a low total flow rate and pressure would require a small laser flux and thus little energy to reach saturation, but the throughput would be extremely small, thereby requiring a long run and therefore much energy and time to obtain the desired amount of isotope.

The laser, if a laser is used to excite the sensitizer molecules, should, of course, match the absorption of the sensitizer. A multiple-line or mode or a single-line or mode laser can be used. As stated above, the power of the laser should be sufficient to nearly saturate the absorption which requires a power density of about 1 to about $10^3$ watts/cm² for laboratory-scale experiments and appropriately larger values for commercial pressures and flow rates. A cw $CO_2$ laser is preferred. The preferred location of the laser is external to the flow cell for commercial operations; however, any other arrangement which provides a uniform and sufficient irradiation can be used, e.g., inracavity or multiple lasers).

The stable end products (deuterium bromide, hydrogen bromide, alkyl bromide, and deuterated alkyl bromide) are enriched in deuterium. They can be separated by any standard chemical fractionization process, i.e., by a method comprising a scrubbing with water and a partial liquidification of the gas stream.

The alkane reagent (the feedstock) for the reaction of this technique is a mixture of an alkane with one to four carbon atoms and its deuterated species. The deuterated species must closely match while the protonated species does not. For the initial feed, the preferred mixture is one of the above with a natural abundance of the deuterated species. Due to the inexpensiveness and the availability of natural methane, methane with a natural abundance of deuterated methane is most preferred. It is, of course, possible to have an alkane with any level of deuteration as the feedstock.

Bromine atoms can be produced by any type of dissociation techinque, e.g., by an rf discharge or by a laser. The bromine atoms can be generated before their introduction into the reaction site or they can be generated in situ in the reaction mixture by irradiation with a laser operating in the dissociative visible absorption band of bromine. The amount of molecular bromine can vary widely, depending on the exact method and parameters of the dissociation process used and the wall-recombination rate, so as to limit the consumption of $^{13}CH_3F$ to 10 to 60%. If the amount is about the stoichiometric amount or less, the output is usually seriously reduced. The amounts preferred, for economic and other reasons, are typically from 10 to 100 times the stoichiometric amount, based on a single substitution.

The reactants are mixed with a deactivating gas so that the VT and VVT deactivation rates are faster than the VV interisotopic energy transfer. The deactivating gas may be any gas inert to the ongoing chemical reaction and nonabsorptive to the laser irradiation. Examples of a deactivating gas are sulfur hexafluoride ($SF_6$), nitrogen, and the noble gases. Regardless of whether the process is batch or continuous the volume percent of the deactivator is from 1 to 95 percent depending on the VT and VVT rates of the deactivation, its heat transfer properties, and the exact mechanical configuration of the system.

If bulk heating or insufficient flow velocity is encountered, it may be advantagous to have independent control of these parameters by the addition of a diluent gas. A diluent gas is inert to the ongoing chemical reaction, does not absorb the laser irradiation, and has a slow deactivation rate constant. With some intermediate gases, e.g., argon, they can be used as both a deactivator gas and a diluent gas, unlike krypton which can only be used as a deactivating gas.

The sensitizer gas must promote the vibrational chemistry of the subject process with isotopic selectivity by transferring its vibrational energy to one of the feedstock constituents. This is possible if the configuration of the energy levels of the sensitizer-gas molecule more closely approximates that of one of the feedstock components. The preferred sensitizer gas is carbon dioxide, but carbon monoxide, nitrogen, or oxygen, can also be used. The excitation energy available in the sensitizer molecule can be higher than the energy of the laser or radiation because the sensitizer can be prepared in highly excited states by conventional means or by hot-band laser absorption. Nitrogen or a nitrogen—$CO_2$ mixture of at least 30 percent $CO_2$ is best suited for excitation by non-laser means, which for nitrogen is by electrical discharge techniques. The total amount of sensitizer gas, i.e., the amount necessary to vibrationally saturate the corresponding transition of the deuterated alkane, is preferably about equal to the amount of the deuterated alkane.

The following examples use a reactor system as shown in FIG. 1. The flow reaction is a 1.0-m-long, 24-mm-i.d quartz tube, coated internally with phosphoric acid, surrounded by an oven, and positioned intracavity to a conventional low-pressure, longitudinal-flow cw $CO_2$ laser. The methane and bromine reactants are premixed with the $CO_2$ sensitizer and an argon carrier gas. The entire mixture is injected at one end of the flow cell. The beam of the argon ion laser, which operates in the multipleline mode, is introduced to the flow reactor by means of reflection from a germanium plate. With the $CO_2$ laser on any line in the 9- or 10 $\mu m$ bands, vibrationally excited $CO_2$ molecules are produced in the flow reactor by hot-band absorptions on the usual laser transistions. Collisional pumping can further produce even higher excited states.

A quadrupole mass spectrometer (not shown in FIG. 1) working in combination with a two-channel boxcar integrator with an internal rationmeter, is used to monitor any two product mass amplitudes and determine their ratio as the laser is cycled on and off. For the $CH_2D_2$—$CH_4$ system, the hydrogen-deuterium isotope ratio in the reaction products is determined by monitoring the amplitude ratio $\rho$ of the parent peaks at m/e=94 and 96:

$$\rho = [CH_3{}^{79}Br]/([CHD_2{}^{79}Br]+[CH_3{}^{81}Br])$$

For the $CH_3D$—$CH_4$ system the ratio of $[CH_3{}^{79}Br]$ to $[CH_2D{}^{79}Br]$ parent peaks was monitored. These ratios can be translated into enrichment factors according to the following definition:

$$\beta = \frac{(D/H) \text{ product}}{(D/H) \text{ reagent}} \simeq \frac{(D/H) \text{ product, laser on}}{(D/H) \text{ product, laser off}}$$

The following exaples are given to better illustrate the practice of the present invention and are not intended to limit the disclosure or the claims to follow in any manner.

EXAMPLE I $CH_2D_2$—$CH_4 + Br_2$

The reagent flow rates are 0.5 Torr cm$^3$, sec$^1$ of $CH_2D_2$—$CH_4$ (in a 1:1 ratio mixture), 8.9 Torr cm' sec' of $Br_2$, and 42 Torr cm' sec$^{-1}$ of Ar. For these flow rates, the total pressure in the flow reactor was 1.85 Torr, which implies a $CH_2D_2$ partial pressure of 7 mTorr and a mean flow velocity of 0.07 m/sec. The temperature of the reaction is kept below 200° C. Only a moderate value of deuterium enrichment, on the order of 43% is obtained.

EXAMPLE II

$CH_2D_2$—$CH_4 + Br_2$ with $CO_2$

The reagent flow rates are 0.5 Torr cm' sec of $CH_2D_2$—$CH_4$ (in a 1:1 ratio mixture), 8.9 Torr cm$^3$ sec$^{-1}$ of $Br_2$, 12 Torr cm$^3$ sec$^{-1}$ of $CO_2$, and 42 Torr cm$^3$ sec$^{-1}$ of Ar. For these flow rates, the total pressure in the flow reactor was 1.85 Torr, which implies a $CH_2D_2$ partial pressure of 7 m Torr and a mean flow velocity of 0.07 m/sec. The temperature of the reaction is kept below 200° C. The enrichment is on the order of 70%, a considerable improvement over Example I.

EXAMPLE III

$CH_2D_2$—$CH_4 + Br_2$ with $CO_2$ v. Wall Temperature

Figure 2:
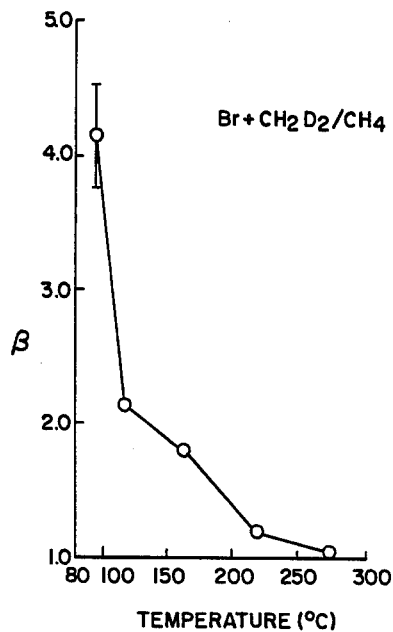
FIG. 2 is a graphic illustration of the wall-temperature dependence of deuterium enrichment factor in the $Br+CH_2D_2/CH_4$ reaction sensitized by $CO_2$.

To illustrate the effect of Wall temperature on the enrichment process, Example II was repeated at wall temperature from 90° to 270° C. The results are given in FIG. 2.

EXAMPLE IV

$CH_2D_2$—$CH_4 + Br$ with $CO_2$ v. total gas mixture pressure

Figure 3:
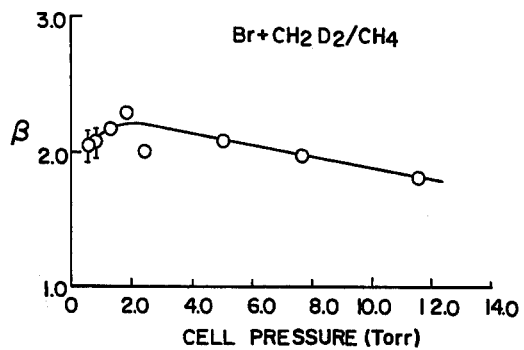
FIG. 3 is a graphic illustration of the effect of the total cell pressure with fixed methane mole fraction on the enrichment factor in the $Br+CH_2D_2/CH_4$ reaction sensitized by $CO_2$.

To illustrate the effect of increasing the total of the pressure of the gas mixture on the enrichment process, the total pressure of the reaction mixture is increased, while the proportions of the individual gases are kept fixed. The laser power, and wall temperature remain unchanged. The results are given in FIG. 3.

EXAMPLE V

$CH_3D$—$CH_4 + Br_2$ with $CO_2$

The process of Example II is repeated except that monodeuterated methane is substituted for dideuterated methane. A deuterium enrichment of 83% at a wall Temperature of 118° C. is obtained.

The large improvement in deuterium enrichment in Example II results entirely from the inclusion of carbon dioxide in gas reaction mixture. As was discussed previously, the large increase is thought to be predominantly due to isotopically selection vibrational-to-vibrational (V—V) energy transfer from $CO_2$-laser-excited carbon dioxide molecules to the dideutermethane, which in turn is reacted with bromine atoms at a faster rate than normal methane. A qualitative explanation for the higher degree of vibrational excitation in the deuterated methane than in normal methane is the close matching of their energy levels to the $CO_2$ (001) level. Energy flow from the $CO_2$ (001) level at 2349 cm$^1$ to the $CH_2D_2$ levels (at 2202 cm$^{-1}$) and the $CH_3D$ level (at 2200 cm$^{-1}$) should be considerably faster than to the lower lying $CH_4$ level at 1534 cm$^{-1}$. The two states in $CH_2D_2$ can also accomodate more vibrational excitation than the single state in $CH_3D$. This is reflected in the higher enrichment obtained in the $CH_2D_2$ reaction.

The dramatic increase in the enrichment factor or as the wall emperature is decreased can be qualitatively attributed to two types of processes occurring in the reaction system. First, as the temperature is decreased, the thermal reaction, which is isotopically nonselective, is reduced, and the increase in the enrichment reflects mainly vibrational effects. Secondly, at higher temperatures, collisions could facilitate scrambling by the vibrational excitations in the two methanes through VV and VT processes involving the larger amount of $CO_2$ present.

The results of Example IV clearly demonstrate the applicability of the present technique over a wide range of feed ratio. This is aspect is important for commercial, large-scale applications of the present invention.

Obviously, many modifications and variations of the present invention was possible in light of the above teachings. It is therefore to be understood that within the scope of the appended claims the invention may be practiced otherwise than as specifically described.

What is claimed is:

1. A method for separating hydrogen isotopes which comprises:

forming a gas mixture comprising bromine atoms, normal and deuterated alkane molecules, a vibrationally excited sensitizer gas selected from the class consisting of carbon dioxide, carbon monoxide, nitrogen, and mixtures thereof and a deactivator gas in an amount sufficient to compete with VV pumping by the sensitizer gas whereby said deuterated alkane molecules become vibrationally excited by V—V vibration transfer from said sensitizer molecules;

reacting both alkane molecules with bromine atoms, to form a bromoalkane, whereby vibrationally excited deuterated alkane molecules react at a faster rate than protonated alkane molecules; and separating deuterated bromoalkane.

2. The method of claim 1 wherein said sensitizer molecules are vibrationally excited prior to being admixed into said gas mixture.

3. The method of claim 2 wherein said sensitizer molecule is vibrationally excited prior to being classified into said gas mixture.

4. The method of claim 2 wherein said sensitizer molecule is vibrationally excited by laser means.

5. The method of claim 1 wherein said sensitizer gas molecules are vibrationally excited, after being admixed into said gas mixture, by a laser means.

6. The method of claims 2, 3, 4, or 5 wherein said sensitizer gas is carbon dioxide.

7. The method of claims 2, 3, 4, or 5 wherein said alkane molecules are methane.

8. The method of claims 2, 3, 4, or 5 wherein said sensitizer gas is carbon dioxide and said alkane molecules are methane.

* * * * *